United States Patent [19]

Beazley et al.

[11] 4,400,167
[45] * Aug. 23, 1983

[54] CENTRIFUGAL SEPARATOR

[75] Inventors: Rodney T. Beazley, Maidstone; Mervyn T. Haggett, Langport, both of England

[73] Assignee: The Glacier Metal Company Limited, Middlesex, England

[*] Notice: The portion of the term of this patent subsequent to Sep. 8, 1998 has been disclaimed.

[21] Appl. No.: 253,291

[22] Filed: Apr. 13, 1981

Related U.S. Application Data

[63] Continuation-in-part of Ser. No. 70,617, Aug. 29, 1979, Pat. No. 4,288,030.

[30] Foreign Application Priority Data

Apr. 11, 1980 [GB] United Kingdom ................. 8012059

[51] Int. Cl.³ .............................................. B04B 9/00
[52] U.S. Cl. .................................. 494/49; 210/360.1; 210/DIG. 17
[58] Field of Search ..................... 233/1 R, 2, 8, 23 R, 233/24, 27, 28

[56] References Cited

U.S. PATENT DOCUMENTS 2,865,562  12/1958  Burke .

FOREIGN PATENT DOCUMENTS

1063362  3/1954  France .
723339  2/1955  United Kingdom .
735658  8/1955  United Kingdom .
738394  10/1955  United Kingdom .
1035542  7/1966  United Kingdom .
1036661  7/1966  United Kingdom .
1053804  1/1967  United Kingdom .
1232559  5/1971  United Kingdom .
1328683  8/1973  United Kingdom .
1532409  11/1978  United Kingdom .

Primary Examiner—Philip R. Coe
Assistant Examiner—Frankie L. Stinson
Attorney, Agent, or Firm—Pearne, Gordon, Sessions, McCoy, Granger & Tilberry

[57] ABSTRACT

A centrifugal separator for separating contaminants from contaminated fluids comprising shroud means defining a first chamber, bearing means within the shroud means, a hollow rotor rotatably carried by the bearing means, said hollow rotor defining a second chamber for receiving contaminated fluid directly from an inlet passage passing through said bearing means, and connecting an inlet port at the upper end of the shroud means with the upper end of said second chamber, means to rotate said rotor and thereby cause contaminants in the contaminated fluid within said second chamber to migrate towards a side wall of said second chamber under the influence of centrifugal force and to be separated from such contaminated fluid, said means to rotate said rotor comprising outlet reaction port means in said rotor in fluid communication with said second chamber to cause said rotor to rotate upon discharge of fluid from said second chamber to said first chamber and outlet port means for discharging fluid from the bottom of said first chamber.

6 Claims, 6 Drawing Figures

CENTRIFUGAL SEPARATOR

This application is a continuation-in-part of the copending application of the same inventors, Ser. No. 70,617, filed Aug. 29, 1979, now U.S. Pat. No. 4,288,030, granted Sept. 8, 1981.

BACKGROUND OF THE INVENTION

This invention relates to centrifugal separators for separating contaminants from contaminated fluids, and particularly for extracting solid matter from oil or other fluids or for separating a heavier fluid from a lighter fluid (for example, water from fuel oil). Such separators include a rotatable drum through which fluid is fed so that during the period when a part of the fluid remains in the drum it is subjected to centrifugal action caused by the rotation. This causes solid matter in the fluid or the heavier of the two fluids to be separated and be retained around the circumferential wall of the drum while the "cleaned" fluid is taken to where it is required for use. The drum is provided with one or more outlet nozzles through which fluid leaves the interior of the drum, the fluid issuing from the nozzles with a substantially tangential component with respect to the drum whereby the drum is caused to rotate by the reaction of the jets of fluid issuing from the nozzles. Subsequently such a centrifugal separator will be referred to as of the kind described.

The invention has particular application to the cleaning of lubricating oil in internal combustion engines. Although centrifugal separators of conventional type have been used for this purpose, oil filters are more widely employed. However conventional fluid filters, such as oil filters having paper elements, are basically mechanical strainers which include a filter element having pores which trap and segregate dirt from the fluid. Since the flow through the filter is a function of the poe size, filter flow will decrease as the filter pack becomes clogged with dirt. As the filtration system must remove dirt at the same rate at which the dirt enters the oil, a clogged conventional paper element filter cannot process enough oil to keep the dirt level of the oil at a satisfactory level. A further disadvantage of some mechanical strainer type filters is that they tend to remove oil additives. Furthermore, the additives may be depleted to some extent by acting upon trapped dirt in the filter instead of on a working surface of an engine as intended.

Conventional centrifugal separators of the kind referred to must be dismantled for cleaning out the drum when it is nearly full of contaminants. This cleaning process is not only tedious and dirty but involves a relatively expensive construction of drum capable of being repeatedly readily opened up for cleaning and readily reassembled with tightly sealed joints.

Thus while centrifugal separators have an undoubtably superior performance to element type filters the need to be cleaned out has up till now necessitated a complicated construction with relatively heavy machined castings so that it will stand up to periodic cleaning to remove the sludge built up. This has probably militated against the more universal use of centrifugal separators in engines. It has also not been possible to provide an effective warning system to show that the drum is full which further complicates the problem of maintenance.

SUMMARY OF THE INVENTION

The invention is particularly concerned with improvements in centrifugal separators of the kind described such that the separator is a low cost product which may be disposed of in its entirety and replaced with a new unit.

The invention in its preferred forms provides a centrifugal separator for cleaning oil in a vehicle internal combustion engine, which is wholly disposable after the vehicle has done a certain mileage and which is very similar as regards external appearance and fitting and size to a conventional automative spin-on engine block canister filter. To be wholly disposable the separator should be of simple and low cost construction avoiding expensive machined parts and the total number of parts should be kept to a minimum. It should also be resistant to "opening up" to prevent unauthorised attempts to clean out or reclaim the separator.

Such a disposable centrifugal separator is described in U.S. Pat. No. 4,106,689 (Kozulla) and the present invention is concerned with improvements in such centrifugal separators. Kozulla describes a disposable centrifugal separator for separating contaminants from oil used for lubricating an engine, said separator comprising shroud means defining a first chamber, bearing means within the shroud means, a hollow rotor rotatably carried by the bearing means, said hollow rotor defining a second chamber for receiving contaminated oil, inlet port means in said shroud means which port means is aligned with said bearing means and arranged to form a releasable connection with said engine, an inlet passage passing through said bearing means and connecting said inlet port means and said second chamber, means to rotate said rotor and thereby cause contaminants in the contaminated oil within said second chamber to migrate towards the side wall of said second chamber under the influence of centrifugal force and to be separated from such contaminated oil, said means to rotate said rotor comprising outlet reaction port means on said rotor in fluid communication with said second chamber to cause said rotor to rotate upon discharge of fluid from said second chamber to said first chamber, partition means in said second chamber adjacent said outlet port reaction means dividing said second chamber into a centrifuging chamber and an outlet port chamber, said centrifuging chamber and said outlet port chamber being interconnected adjacent the rotary axis of the rotor, and outlet port means in said shroud means for discharging fluid from said first chamber, said outlet port means being arranged to form a releasable connection with said engine.

In such a disposable centrifugal separator as described by Kozulla it has now been found to be sufficient to feed oil into the upper end of the rotor from an inlet at the upper end of the shroud without elaborate axial distribution systems. However, certain modifications have been found to be desirable as hereinafter described. In particular it is desirable that simplified provision be made for keeping centrifuged sludge out of the nozzle chamber. The present Applicants have found that the danger of sludge entering the nozzle chamber arises mainly on restarting the separator when sludge may have slumped to the bottom of the centrifuging chamber under gravity. By providing a peripheral channel at the bottom of the centrifuging chamber, this danger is minimised and the cylindrical screen suggested by Kozulla is unnecessary.

According to one aspect of the invention, there is provided a disposable centrifugal separator for separating contaminants from oil used for lubricating an engine, said separator comprising shroud means defining a first chamber, bearing means within the shroud means, a hollow rotor rotatably carried by the bearing means, said hollow rotor defining a second chamber for receiving contamined oil, inlet port means in said shroud means which port means is aligned with said bearing means and arranged to form a releasable connection with said engine, an inlet passage passing through said bearing means and connecting said inlet port means and said second chamber, means to rotate said rotor and thereby cause contaminants in the contaminated oil within said second chamber to migrate towards the side wall of said second chamber under the influence of centrifugal force and to be separated from such contaminated oil, said means to rotate said rotor comprising outlet reaction port means on said rotor in fluid communication with said second chamber to cause said rotor to rotate upon discharge of fluid from said second chamber to said first chamber, partition means in said second chamber adjacent said outlet port reaction means dividing said second chamber into a centrifuging chamber and an outlet port chamber, said centrifuging chamber and said outlet port chamber being interconnected adjacent the rotary axis of the rotor, and outlet port means in said shroud means for discharging fluid from said first chamber, said outlet port means being arranged to form a releasable connection with said engine, characterised in that said partition means cooperates with said side wall to provide a peripheral channel at the lower end of said centrifuging chamber.

Preferably said partition means slopes downwardly in the radially outward direction.

Although the term "disposable" as used herein generally indicates a wholly disposable separator, it is envisaged that the separator should be openable and that only the rotor should be replaced. Such a separator where the shroud is a permanent part and the rotor is replaceable is described and shon in Ishii U.S. Pat. No. 3,762,633.

It has also been found to be advantageous to mount the rotor on stub axles extending between the shroud and the rotor. Accordingly the present invention in a further aspect provides a centrifugal separator of the kind described which comprises an outer housing or shroud, and a drum or rotor mounted to rotate within the housing about two separate stub axles. Generally the stub axles will extend between the outer housing and the drum. Also, the stub axles will normally be non-rotating; however, if desired they could be carried by and rotate with the drum.

According to another aspect of the present invention a wholly disposable centrifugal separator of the kind described comprises an outer sheet metal canister providing a shroud having spaced therefrom an inner sheet metal canister providing a rotor, the inner and outer canisters both having at one end an opening, the edges of which are shaped to form in combination a bearing and journal for relative rotation of the canisters.

More particularly (though not exclusively) the invention provides a wholly disposable centrifugal separator of the kind described having an open ended rotor canister, a plate closing the open end having tangential nozzles formed therein and a third plate attached to the internal periphery of the rotor canister and spaced from the nozzle plate thereby forming a second chamber in communication with the main rotor chamber, the rotor canister being mounted within a second canister with two separate stub axles extending between the outer canister and the rotor canister at each end thereof.

The stub axle assembly remote from the nozzles may for example be formed by pressing out a lipped aperture in the end of the second canister remote from the nozzles to form a stub axle construction cooperating with a lipped aperture pressed out from the adjacent end of the first canister. Alternatively, apertures in the shroud and rotor may be joined by a simple stub axles.

Similarly a lower bearing journal may be formed by pressing out an aperture in the nozzle plate of the rotor.

In one particular embodiment of the invention a lower stub axle assembly at the ends of the canisters close to the nozzles may be formed by pressing out an aperture in the nozzle plate to cooperate with a rotor suppot ring attached to the internal surface of the second canister.

According to yet another embodiment of the invention in a centrifugal separator of the kind referred to, the journals, stub axles or spigots for rotation of the rotor remain attached to the engine when the separator is removed. Thus the journal may be of more durable and expensive design as the expense of disposal is avoided.

Desirably the bearing means includes a support cage or spider secured in the bottom region of the shroud. This support cage may provide a baffle for oil leaving the nozzles and proceeding out of the shroud whereby the rotor may reach as high a speed as possible without drag being caused by oil entering the annular space between the rotor and the shroud. Also, to reduce or obviate this drag problem, it is desirable to provide a deep sump below the rotor. The size of this sump may be defined in a number of ways; for example it is desirably at least 40 mm deep. It is also desirable that the rotor has a volume no greater than two thirds that of the shroud.

Thus according to another aspect of the invention, there is provided a disposable centrifugal separator for separating contaminants from oil used for lubricating an engine, said separator comprising shroud means defining a first chamber, bearing means within the shroud means, a hollow rotor rotatably carried by the bearing means, said hollow rotor defining a second chamber for receiving contaminated oil, inlet port means in said shroud means which port means is aligned with said bearing means and arranged to form a releasable connection with said engine, an inlet passage passing through said bearing means and connecting said inlet port means and said second chamber, means to rotate said rotor and thereby cause contaminants in the contaminated oil within said second chamber to migrate towards the side wall of said second chamber under the influence of centrifugal force and to be separated from such contaminated oil, said means to rotate said rotor comprising outlet reaction port means on said rotor in fluid communication with said second chamber to cause said rotor to rotate upon discharge of fluid from said second chamber to said first chamber, partition means in said second chamber adjacent said outlet port reaction means dividing said second chamber into a centrifuging chamber and an outlet port chamber, said centrifuging chamber and said outlet port chamber being interconnected adjacent the rotary axis of the rotor, and outlet port means in said shroud means for discharging fluid from said first chamber, said outlet port means being arranged to form a releasable connection with said engine, characterised by forming said bearing means as axially aligned stub axles and leaving said centrifuging chamber substantially unrestricted whereby oil entering said centrifuging chamber through said inlet passage immediately flows outwardly towards said side wall under centrifugal force.

According to a further aspect of the invention, there is provided a centrifugal separator for separating contaminants from contaminated fluids comprising shroud means defining a first chamber, bearing means within the shroud means, a hollow rotor rotatably carried by the bearing means, said hollow rotor defining a second chamber for receiving contaminated fluid from an inlet passage passing through said bearing means, means to rotate said rotor and thereby cause contaminants in the contaminated fluid within said second chamber to migrate towards a sidewall of said second chamber under the influence of centrifugal force and to be separated from such contaminated fluid, said means to rotate said rotor comprising outlet reaction port means in said rotor in fluid communication with said second chamber to cause said rotor to rotate upon discharge of fluid from said second chamber to said first chamber and outlet port means for discharging fluid from the bottom of said first chamber, said outlet port means being disposed on the rotational axis of the rotor at the opposite end of said first chamber to said inlet passage and being smaller in diameter than said first chamber characterised in that an annular ledge is formed in the bottom region of the first chamber, the axial distance between the reaction ports and the uppermost part of the ledge being at least 40 mm.

According to yet another aspect of the invention, there is provided a centrifugal separator for separating contaminants from contaminated fluids comprising shroud means defining a first chamber, bearing means within the shroud means, a hollow rotor rotatably carried by the bearing means, said hollow rotor defining a second chamber for receiving contaminated fluid from an inlet passage passing through said bearing means, means to rotate said rotor and thereby cause contaminants in the contaminated fluid within said second chamber to migrate towards a sidewall of said second chamber under the influence of centrifugal force and to be separated from such contaminated fluid, said means to rotate said rotor comprising outlet reaction port means on said rotor in fluid communication with said second chamber to cause said rotor to rotate upon discharge of fluid from said second chamber to said first chamber and outlet port means for discharging fluid from the bottom of said first chamber, said outlet port means being disposed on the rotational axis of the rotor at the opposite end of said first chamber to said inlet passage and being smaller in diameter than said first chamber characterised in that the reaction ports are spaced from the lower end of the first chamber such that the second chamber has a volume no greater than two thirds that of the first chamber.

BRIEF DESCRIPTION OF THE DRAWINGS

Embodiments of the invention are hereinafter described by way of example with reference to the accompanying diagrammatic drawings in which.

DETAILED DESCRIPTION OF THE PREFERRED EMBODIMENTS

Figure 1:
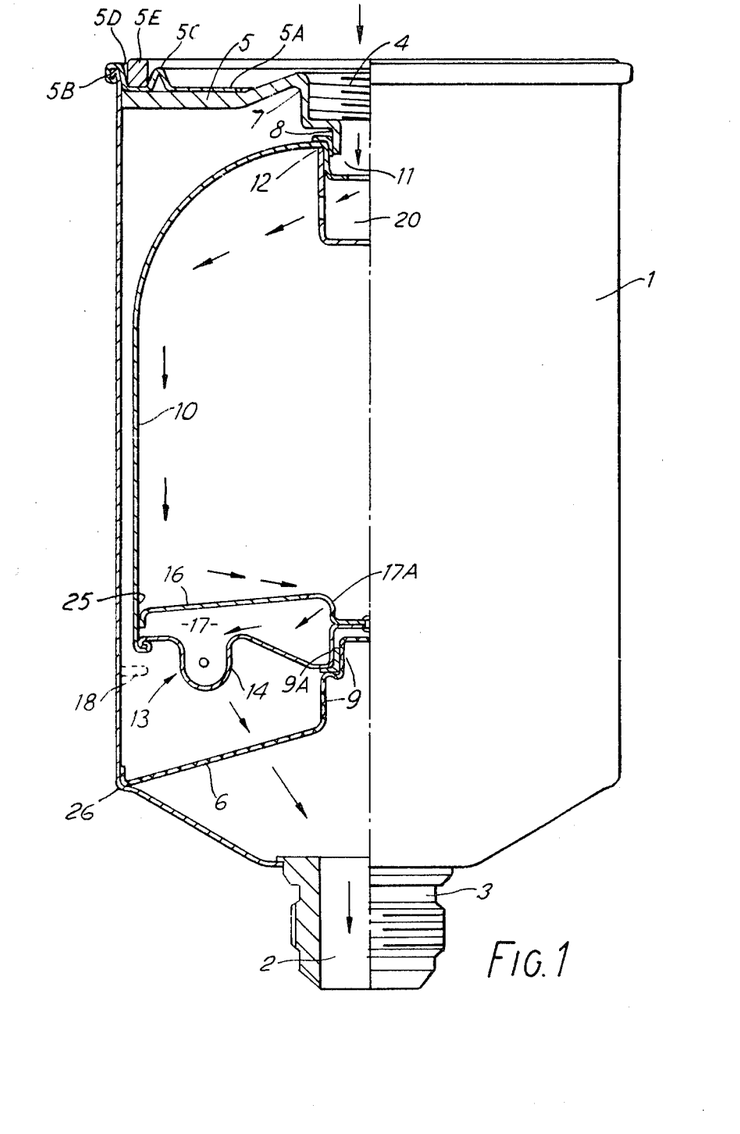
FIG. 1 is a part-sectioned elevation of one form of centrifugal separator according to the invention which is intended for use as an oil cleaner for a motor vehicle.

FIG. 1 shows a particular stub axle construction in which sheet metal lips on a canister forming the rotor cooperate with lips on a canister forming the shroud means.

Referring now in more detail to FIG. 1 there is shown a pressed out sheet metal outer canister 1 having a union 3 providing an oil outlet 2 from which oil is led away from the separator to the engine via a flexible oil return pipe (not shown). The outer canister 1 comprises four simple sheet metal pressings, viz the body of the canister 1, the top closure 5, the top closure support ring 5A and a rotor support cage 6, all being joined together e.g. by the sheet metal rolled-over-joint technique or by simple welding. As shown, the top closure support ring 5A is connected to the body of the canister 5 by a rolled-over-joint 5B and has an annular upward projection 5C providing an annular groove 5D housing an annular resilient seal 5E. The top closure 5 has a screw-threaded opening 7 with a downturned extended lip 8, the opening 7 providing an oil inlet union 4 so that the whole centrifugal separator unit screws onto a boss on the engine in the same way as the spin-on element filter conventionally used. Such an arrnagement is described in Kozulla U.S. Pat. No. 4 106 689 referred to above. The rotor support cage or spider 6 attached to the inner surface of the canister 1 is provided with an upturned lip 9. The lips 8 and 9 thus form stub axles for the rotor.

The rotor 10 is a simple pressed-out canister having an aperture 11 to communicate with the oil inlet and also having a lip 12 which cooperates with the lip 8 to form a rotary bearing and a thrust bearing. Since lubrication is available from the oil the rotor canister may normally run around (or inside) the lip 8 with steel-to-steel contact without the necessity of providing a separate bearing. However, an L-section ring of low-friction bearing material may be provided as shown. The adequacy of the bearing arrangement will to a large extent depend on the number of revolutions the rotor is required to undertake before the rotor becomes full of dirt. Similarly, the lower end of the rotor canister is provided by a pressed out plate 13 which includes two pressed out nozzle outlets 14 and 15 (only one of which is shown). The lip 9 on the support spider 6 forms a bearing surface to run against an upturned rim 9A in the plate 13. Finally a further plate 16 spaced apart from the nozzle plate 13 provides a chamber 17 into which oil passes before entering the driving nozzles 14 and 15 to drive the rotor. This oil leaves the separator via the outlet 2 after passing through the rotor support cage (i.e. spider 6).

The plate 16 slopes downwardly in the outward direction and provides a peripheral channel 25 with the wall of the rotor 10 for the collection of sludge and dirt and the prevention of such sludge and dirt entering the nozzle chamber 17.

Since the rotor canister 10 is required to rotate at its maximum speed for effective separation and needs to occupy the outer canister volume as fully as possible there is a tendency for oil leaving the rotor canister 10 to be driven up the relatively narrow clearance between the concentric walls of the rotor canister 10 and the outer canister 1. The rotor support cage or spider 6, if suitably apertured or shaped, may constrain oil proceeding in this direction while not at the same time providing a restriction to free downward flow of oil. A small annular lip 18 may also prove effective in this respect. An oil inlet directing chamber 20 also of pressed-out sheet metal construction may be pressed over or otherwise fixed to lip 12 over the upper aperture 11 in the rotor 10, so that the oil will enter through the outer canister 1 as shown by the arrows and then be directed through a series of radial apertures in the wall of the chamber 20 towards the outside of the rotor 10. The arrows show how the oil is first directed towards the outer wall of the rotor 10 and is prevented from passing directly into the nozzle chamber 17 by the formed nozzle plate 16 before experiencing the necessary dwell time in the rotor so that efficient dirt separation can take place. It will also be noted that the oil, before entering the nozzle chamber 17, has to migrate towards the axis of rotation before turning into the nozzle chamber 17 via holes 17A as shown by the arrows.

The spider 6 (which is similar to that shown in FIG. 4) is mounted on and welded to a ledge 26 at the lower end of the canister 1. In the preferred forms of the invention the nozzles 14, 15 are at least 40 mm above this ledge 26.

It is to be noted that here there is no spindle extending through the rotor; such a spindle is present in all conventional centrifugal separators of the kind described and directs the oil flow into the rotor. It has now been found that sufficient dwell time can surprisingly be obtained without the need of a spindle extending through the rotor. It is sufficient for the oil to turn towards the outer wall of the rotor at the inlet and to turn away from the wall before it enters the nozzle chamber. The omission of a through spindle drastically reduces the cost of the assembly and eases "permanent" joining of the rotor canister and outer canister so that it cannot be tampered with and leaves more space for oil in the rotor.

Figure 2:
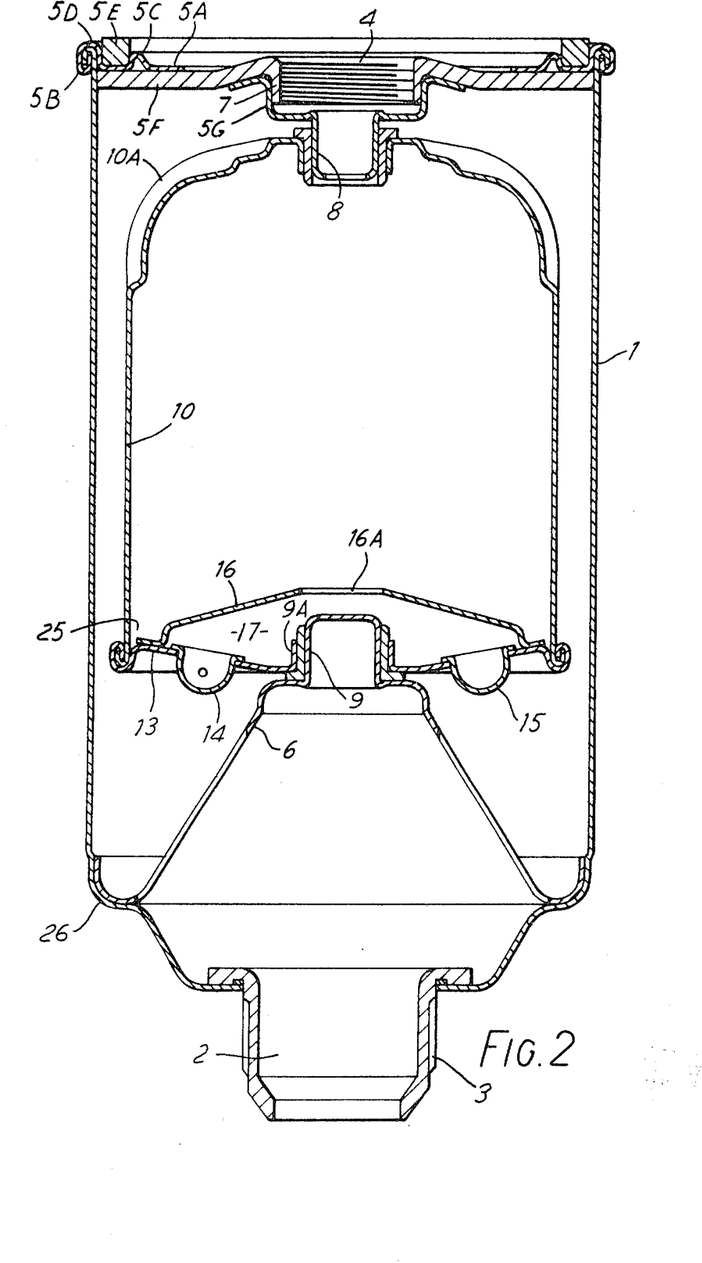
FIG. 2 is a vertical section through another form of a centrifugal separator according to the invention.

FIG. 2 is similar to FIG. 1 and only differences will be described. These are as follows:

1. A more distinct peripheral channel 25 is provided in the centrifuging chamber.
2. The oil inlet chamber 20 is omitted; as mentioned previously it is optional in all embodiments of the invention.
3. The top closure 5 is made in two parts 5F and 5G.
4. The rotor canister 10 has strengthening ribs 10A at the top corner.
5. The plate 16 is simplified and has an axial opening 16A.
6. The spider 6 is axially lengthened to provide a deep sump at the lower end of canister 1.

Figure 3:
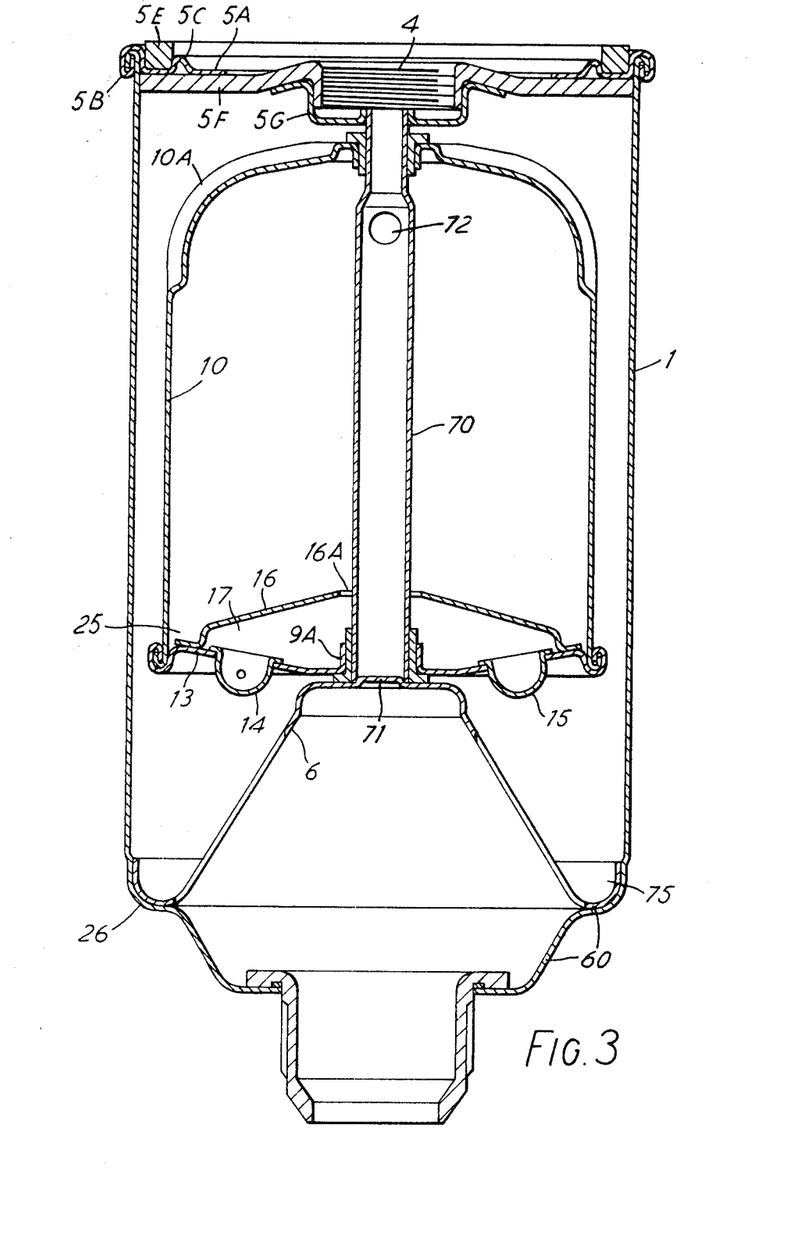
FIG. 3 is a vertical section through a third form of a centrifugal separator according to the invention.

FIG. 3 differs from FIG. 2 in that lip 8 is extended to form a full length hollow spindle 70 fitting over a slight projection 71 on spider 6. Oil enters the inner canister 10 through one or more lateral opening 72 in the spindle 70. Although a continuous spindle adds to costs it obviates any problems which might arise due to misalignment of the stub axles.

Figure 4:
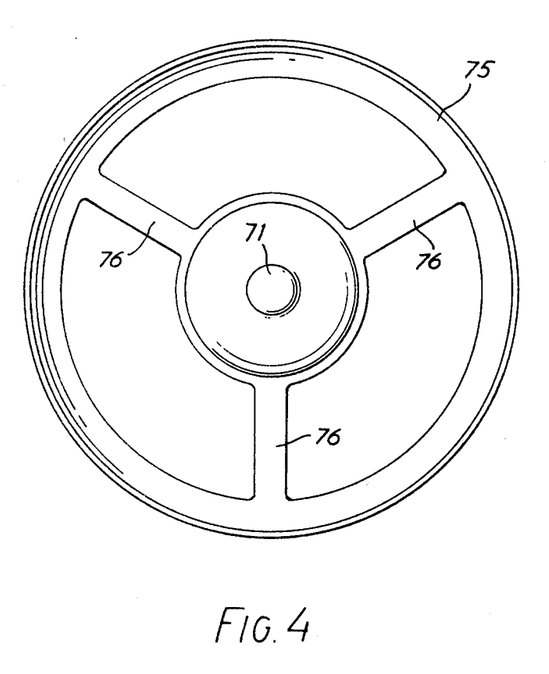
FIG. 4 is a top plan view of the spider shown in FIG. 3.

FIG. 4 shows the spider 6 of FIG. 3 in plan view. The spider rests on and is secured to ledge 26 in the bottom 60 of canister 1. It has a peripheral channel 75 which is complete only at location opposite the three ribs 76. Elsewhere it is open on the inside to permit oil to drain away. It will be seen that the ribs 76 provide substantially no obstruction to downward oil flow and yet tend to inhibit rotary swirling motion of the oil in the bottom of the canister.

Figure 5:
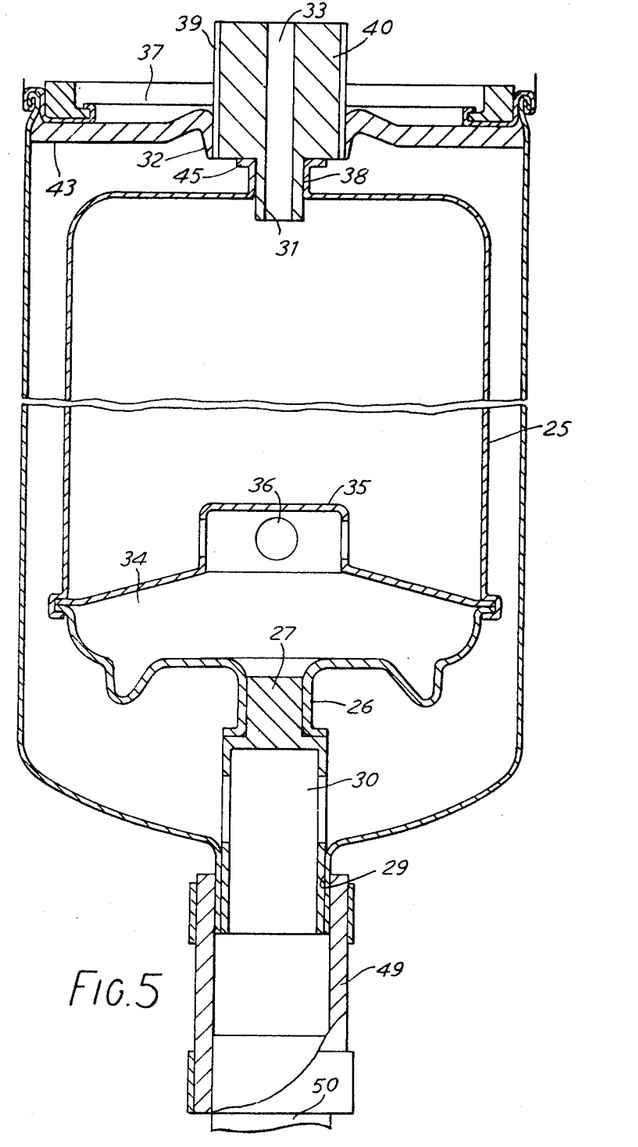
FIG. 5 is a vertical section through another form of a centrifugal separator according to the invention.
Figure 6:
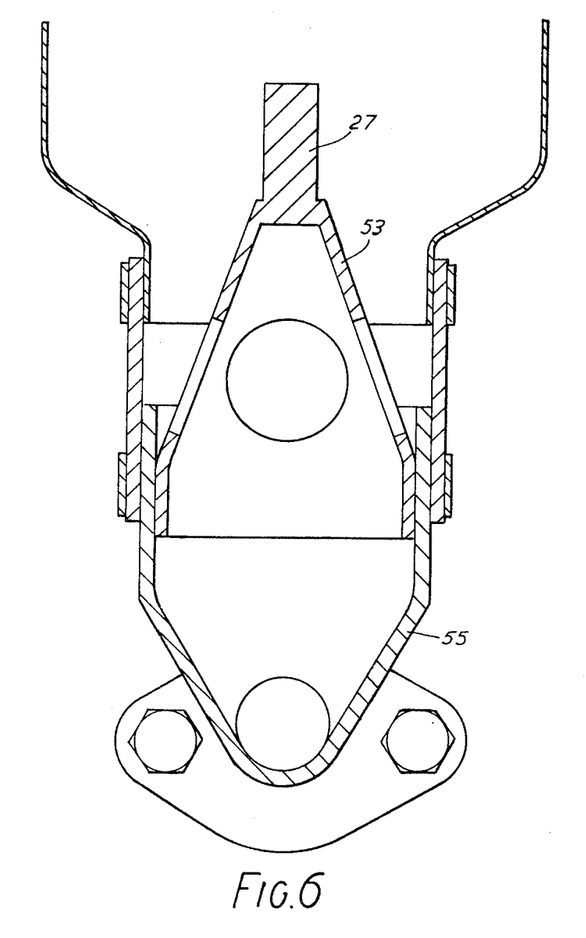
FIG. 6 is a vertical section showing a modification of the lower end of FIG. 5.

In the arrangement shown in FIG. 5 the lower stub axle assembly is thrown away with the filter. In FIG. 6 the lower stub axle assembly is rearranged. Thus, with reference to FIG. 2, the flexible tube 49 can be released and lowered and the outer canister lowered so that upper bearing 38 is free of the upper stub axle 31. With reference to FIG. 3 a lower stub axle spigot 27 is permanently attached to the engine by the inclined spigot supports 53. Thus after the canister 1 has been dropped away from the top spigot there is sufficient room between the ends of the canister and the spigot support 53 to lift and manipulate sideways the entire canister so that it may be separated from both its spigots (stub axles) which remain attached to the engine. Another plastic plug for transport will be required for the lower end of the outer canister. If desired spigot support 53 can be screwed into member 55 to permit spigot separation.

Details of the manner in which the filter is attached to the engine oil inlets and outlets will now be described in more detail in relation to FIG. 5.

Situated on the engine is a filter mounting plate which has a through hole leading into the oil circuit. Screwed into this threaded hole is the adaptor 40 threaded on the outside at 39 and through which the passage 33 passes. At the end of and concentric with the threaded portion 39 is the integral cylindrical spigot 31 which forms the upper journal or stub axle about which the filter rotor rotates. The adaptor 40 and integral spigot 31 are manufactured from bronze or other suitable bearing material. The screwed section of the adaptor 40 fits into the engine at one end and also secures the outer canister to the engine via its top closure 43, a conventional seal 37 being provided as in earlier noted U.S. Pat. No. 4,106,689.

The rotor canister has a flanged upper lipped surface 45. The spigot 31 and lipped ring 38 form a stub axle bearing assembly. During operation the upper flange 45 is in contact with the bottom face of the adaptor 40 thus forming a thrust bearing. The rotor rotates about the spigot 31 so that its cylindrical surface 38 acts as a journal bearing.

The chamber nozzle 34 is defined in part by a pressed base component containing the two jets, a central flanged cylindrical surface 26 which forms the lower bearing surface of the rotor concentric with the upper bearing arrangement. The flange 26 rotates about the spigot 27 which is manufactured from bronze or other bearing material and which has a shoulder acting as a lower thrust bearing. The spigot 27 also forms the lower journal bearing. The tube 49 connects the canister to a flange pipe 50 mounted on the engine sump.

In all embodiments of the invention, it may be desirable to provide a pressure relief valve in the upper part of the outer canister to release excess air pressure to atmosphere.

The following modifications of the FIG. 1 embodiment may also be advantageous;

(a) the provision of a horizontal annular oil deflector plate extending outwards from the base of chamber 20 e.g. to approximately half the radius of the rotor.

(b) the provision of a solid spigot or stub shaft at the lower bearing point.

(c) heat-hardening of bearing surfaces provided by presed metal.

Desirably the spinning rotor should be in vertical equilibrium so that there is little or no resultant force acting on the upper or lower thrust bearings. In the FIG. 1 embodiment this may be aided by providing a bleed opening in the centre of the lower rotor wall to connect the main rotor chamber with the space above the lower stub axle or spigot. Such a bleed arrangement, besides effecting some measure of pressure balancing, will also facilitate lubrication of the lower bearing.

It will be noted that in all the embodiments of the invention the bearings provided by the outer canister are rigid and not spring loaded and the upper bearing is of smaller diameter than the lower one so that pressurised oil in the rotor has a lifting effect.

The deep sump arrangements shown in FIGS. 2 and 3 have the advantage that any oil build up is unlikely to get near the nozzles or the periphery of the rotor. Arrangements with gauzes have been proposed to solve this problem but they impeded oil flow.

In practice oil enters the filter at a pressure of between 60 and 100 lbs. per sq. in. and has a rate of about 150 gals. per hour, and 150 gals. has got to leave per hr. at zero pressure in order not to have a build up. The zero pressure means that the outlet opening has to be about 8-12 times bigger than the inlet opening. Thus, typically there is an inlet of $\frac{1}{8}''$ diameter and an outlet hole of $1-1\frac{1}{2}''$ diameter.

As explained above the separator could be modified so that the shroud can be opened up for replacement of the rotor. The embodiment of FIG. 3 is particularly suitable for such modification e.g. in a similar manner to that described in U.S. Pat. No. 3,762,633 mentioned above.

We claim:

1. In a disposable centrifugal separator for separating contaminants from oil used for lubricating an engine, said separator comprising shroud means defining a first chamber, bearing means within the shroud means, a hollow rotor rotatably carried by the bearing means, said hollow rotor defining a second chamber for receiving contaminated oil, inlet port means in said shroud means which port means is aligned with said bearing means and arranged to form a releasable connection with said engine, an inlet passage passing through said bearing means and connecting said inlet port means and said second chamber, means to rotate said rotor and thereby cause contaminants in the contaminated oil within said second chamber to migrate towards the side wall of said second chamber under the influence of centrifugal force and to be separated from such contaminated oil, said means to rotate said rotor comprising outlet reaction port means on said rotor in fluid communication with said second chamber to cause said rotor to rotate upon discharge of fluid from said second chamber to said first chamber, partition means in said second chamber adjacent said outlet port reaction means dividing said second chamber into a centrifuging chamber and an outlet port chamber, said centrifuging chamber and said outlet port chamber being interconnected adjacent the rotary axis of the rotor, and outlet port means in said shroud means for discharging fluid from said first chamber, said outlet port means being arranged to form a releasable connection with said engine, the improvement wherein said partition means cooperates with said side wall to provide a peripheral channel at the lower end of said centrifuging chamber, and said bearing means comprises a spingle extending longitudinally of said first chamber and providing said passage and a spider secured within said shroud in the bottom region thereof supporting the lower end of said spindle.

2. A centrifugal separator according to claim 1 wherein said partition means slopes downwardly in the radially outward direction.

3. A centrifugal separator according to claim 1 wherein the rotor is of sheet metal.

4. In a centrifugal separator for separating contaminants from contaminated fluids comprising shroud means defining a first chamber, bearing means within the shroud means, a hollow rotor rotatably carried by the bearing means, said hollow rotor defining a second chamber for receiving contaminated fluid from an inlet passage passing through said bearing means, means to rotate said rotor and thereby cause contaminants in the contaminated fluid within said second chamber to migrate towards a sidewall of said second chamber under the influence of centrifugal force and to be separated from such contaminated fluid, said means to rotate said rotor comprising outlet reaction port means in said rotor in fluid communication with said second chamber to cause said rotor to rotate upon discharge of fluid from said second chamber to said first chamber and outlet port means for discharging fluid from the bottom of said first chamber, said outlet port means being disposed on the rotational axis of the rotor at the opposite end of said first chamber to said inlet passage and being smaller in diameter than said first chamber, the improvement wherein an annular ledge is formed in the bottom region of the first chamber, the axial distance between the reaction ports and the uppermost part of the ledge being at least 40 mm.

5. In a centrifugal separator for separating contaminants from contaminated fluids comprising shroud means defining a first chamber, bearing means within the shroud means, a hollow rotor rotatably carried by the bearing means, said hollow rotor defining a second chamber for receiving contaminated fluid from an inlet passage passing through said bearing means, means to rotate said rotor and thereby cause contaminants in the contaminated fluid within said second chamber to migrate towards a sidewall of said second chamber under the influence of centrifugal force and to be separated from such contaminated fluid, said means to rotate said rotor comprising outlet reaction port means on said rotor in fluid communication with said second chamber to cause said rotor to rotate upon discharge of fluid from said second chamber to said first chamber and outlet port means for discharging fluid from the bottom of said first chamber, said outlet port means being disposed on the rotational axis of the rotor at the opposite end of said first chamber to said inlet passage and being smaller in diameter than said first chamber, the improvement wherein the reaction ports are spaced from the lower end of the first chamber such that the second chamber has a volume no greater than two thirds that of the first chamber, and said bearing means comprises a spider secured within said shroud in the bottom region thereof.

6. A centrifugal separator according to claim 4, wherein the bearing means comprises a spider secured within said shroud in the bottom region thereof.

* * * * *

UNITED STATES PATENT AND TRADEMARK OFFICE
CERTIFICATE OF CORRECTION

PATENT NO. : 4,400,167

DATED : August 23, 1983

INVENTOR(S) : Rodney T. Beazley and Mervyn T. Haggett

It is certified that error appears in the above-identified patent and that said Letters Patent is hereby corrected as shown below:

On the title page insert the following references:

| | | |
|---|---|---|
| -- 3,762,633 | 10/1973 | Ishii |
| 4,106,689 | 8/1978 | Kozulla |
| 4,165,032 | 8/1979 | Klingenberg |
| 4,284,504 | 8/1981 | Alexander |
| 4,288,030 | 9/1981 | Beazley, et al -- |

Column 1, line 39, "poe" should read -- pore --

Column 3, line 41, "shon" should read -- shown --

Signed and Sealed this

Nineteenth Day of June 1984

[SEAL]

Attest:

Attesting Officer

GERALD J. MOSSINGHOFF

Commissioner of Patents and Trademarks